United States Patent Office 3,495,783
Patented Feb. 17, 1970

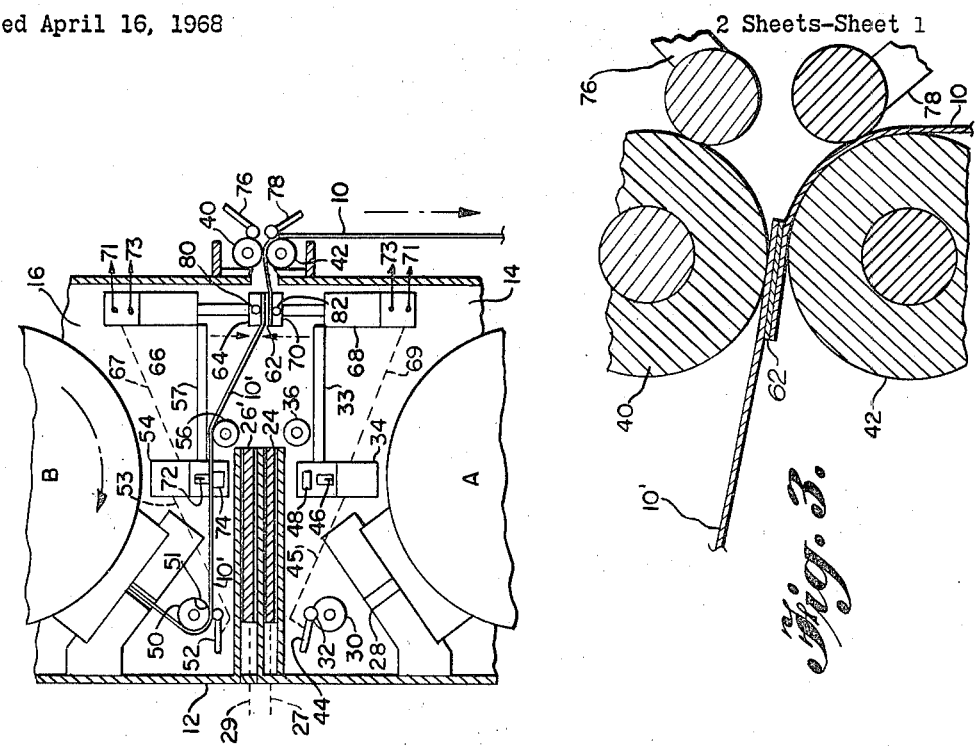
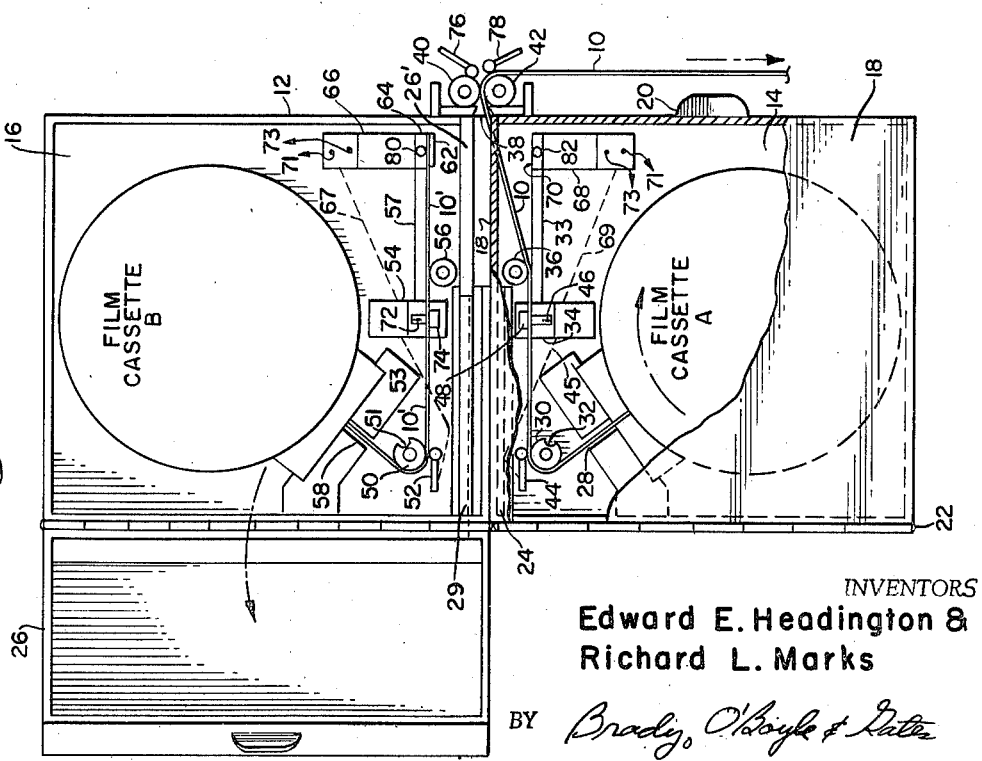

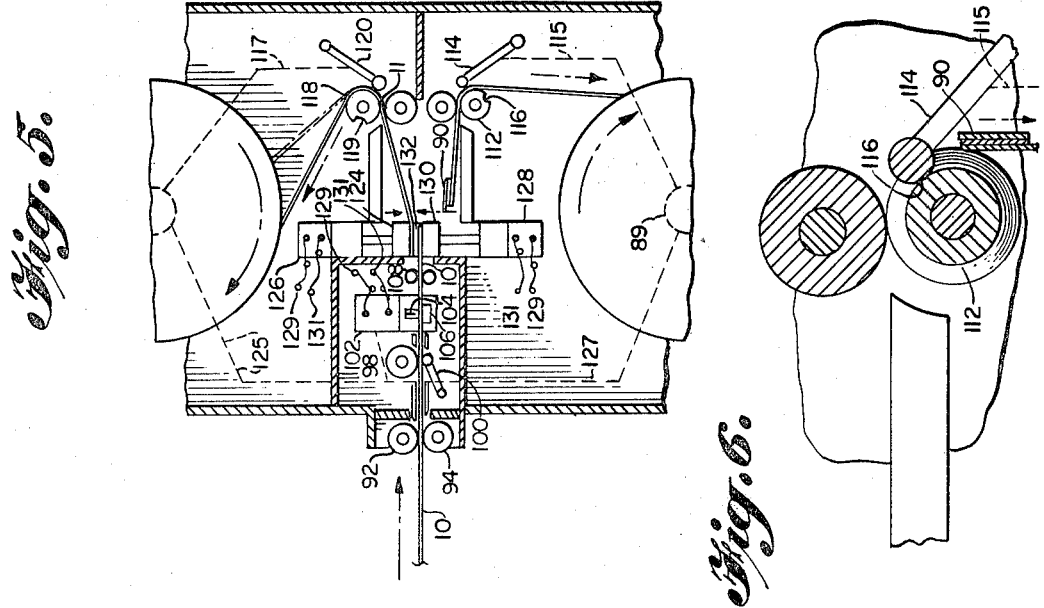
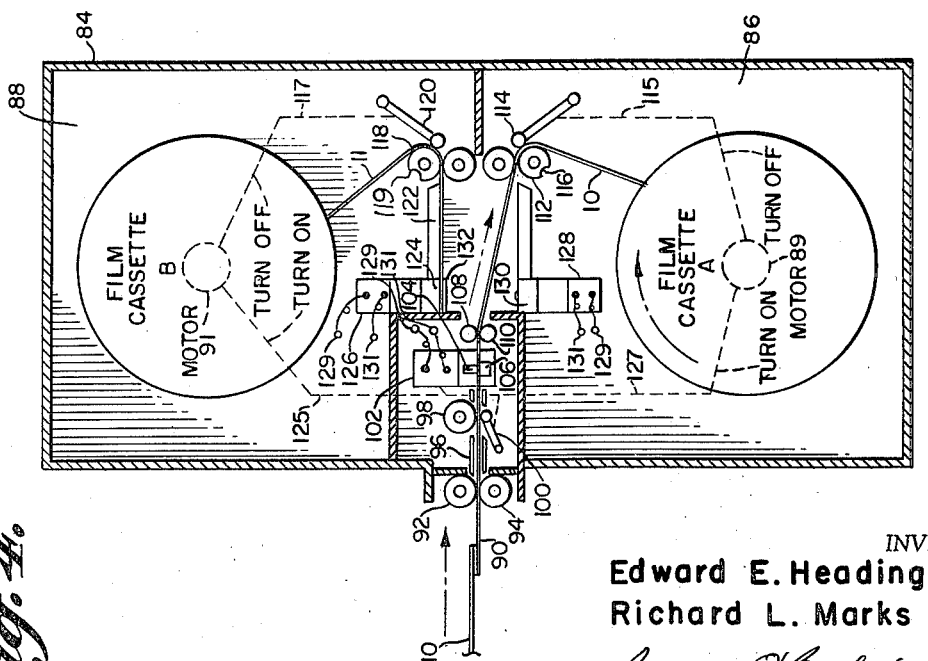

3,495,783
APPARATUS FOR SPLICING MOVING FILM
Edward E. Headington and Richard L. Marks, State College, Pa., assignors to HRB-Singer, Inc., State College, Pa., a corporation of Delaware
Filed Apr. 16, 1968, Ser. No. 721,770
Int. Cl. B65h *19/18*
U.S. Cl. 242—58.4       10 Claims

ABSTRACT OF THE DISCLOSURE

Film supply and takeup apparatus for splicing a length of film to a continuously moving film strip in a light-sealed housing containing a pair of light-sealed film cassettes and a flying web splicer mechanism. A stationary film leader in one cassette having a double sided adhesive tape is forced against the end of the moving film of the other cassette to form a lap joint therebetween so that a single continuously moving length of film is maintained.

BACKGROUND OF THE INVENTION

The subject invention is directed to flying web splicers for film. Apparatus for splicing moving webs is known to those skilled in the art; however, where it is desirable to splice photographic film which is moving in continuous motion while at the same time preventing light from prematurely exposing the film, no such apparatus is known.

SUMMARY OF THE INVENTION

Briefly, the subject invention is directed to photographic film splicing apparatus for continuously moving film and comprises a housing impervious to light including a pair of compartments including access doors thereto and flying film cutting and joining apparatus mounted interiorly thereof, said pair of compartments additionally including sliding light guard doors located adjacent the tape cutting and joining apparatus and adapted to be actuated by the respective access door, being closed when said access door is open but opening upon the closure of said access door, and a pair of opaque film cassettes located in the pair of compartments, the film cassettes being adapted to operate alternately to either feed or be fed a predetermined length of film to or from a moving film strip. Each of the cassettes contains a film leader having adhesive means applied to the leading edge thereof whereupon the film splicer is adapted to receive the film leader and automatically sever the moving film to or from the other cassette and force the edges together, thus maintaining the continuous movement of the film. The subject invention then is a photographic film splicer which is adapted to either act as a supply station or a take-up station of a continuously running film and alternately places it upon one of two cassettes having alternately driven spools or reels in the form of cassettes.

BRIEF DESCRIPTION OF THE DRAWINGS

FIGURE 1 is a side elevation, partially in section, of a first embodiment of the present invention comprising film supply apparatus;

FIGURE 2 is a fragmentary illustration of the mid-portion of the side elevational view shown in FIGURE 1, being further illustrative of the splicing mechanism;

FIGURE 3 is a fragmentary view of an adhesive splice formed by the apparatus shown in FIGURES 1 and 2 passing between two pressure drive rollers;

FIGURE 4 is a side elevational view of a second embodiment of the present invention comprising a take-up unit with access doors removed;

FIGURE 5 is a fragmentary view of the side elevation shown in FIGURE 4 and being illustrative of the splicing operation for feeding a continuous web of film alternately onto two film cassettes; and FIGURE 6 is a fragmentary view of de-energization means for the films cassettes shown in FIGURE 4.

DESCRIPTION OF THE PREFERRED EMBODIMENTS

Directing attention now to FIGURE 1, there is illustrated a supply station for a continuously moving length of film 10. The supply station comprises an opaque housing 12 including two light-sealed compartments 14 and 16 in which are mounted opaque film cassettes A and B, respectively. An access door 18 having a handle 20 is mounted upon a hinge 22 attached to the housing 12 and is adapted to cover substantially one-half of the enclosure including the compartment 14 containing film cassette A. In FIGURE 1, the access door 18 is shown in the closed position and fragmentized to disclose the film cassette A located therein. When the access door 18 is closed, compartment 14 is adapted to be impervious to light. This is provided by means of a sliding light-guard door 24 which is mechanically coupled to and actuated by the movement of the access door 18 by means 27 shown in FIGURE 2. In a similar manner, a second access door 26, shown in the open position, is mounted on the hinge 22 and is adapted to cover substantially the other half of the enclosure including the compartment 16 containing film cassette B. A second light-guard door 26′ is coupled to and actuated by the access door 26 by suitable mechanical means shown schematically by reference numeral 29. When the access door 26 opens, the light-guard door 26′ is slidably moved forward as shown. This prevents any light from entering compartment 14. Likewise, when access door 18 is opened, the light-guard door 24 is slidably moved forward so that light may not enter compartment 16 when the access door 26 is closed.

FIGURE 1 illustrates the continuously moving film 10 being fed fram spool or reel means comprising a film cassette A. The film is fed through a slotted guide 28 and around a grooved idler roller 30 having a notch 32. It is threaded through a film cutter 34, then partially across a platen 33 and then over another idler roller 36. It passes out of the housing 12 through the opening 38 and between two pressure drive rollers 40 and 42 actuated by motor means, not shown.

Additionally, a film sensor member 44 is located adjacent the grooved idler roller 30 and is adapted to fall into the groove 32 when the terminal end of the film 10 coming from film cassette A passes roller 30. The sensor member 44 then activates the film cutter 34 by coupling means 45. The cutter 34 comprises a guillotine-type cutter including a knife member 46 which is forced upwardly to a block 48.

Film cassette B and the compartment 16 is equipped with duplicate apparatus comprising the grooved idler roller 50 including a notch 51, the film sensor 52, the film cutter 54, the idler roller 56 and platen 57. While film is being fed from film cassette A, film cassette B is inserted by opening access door 26 and a leader 10′ is fed through the slotted guide 58 between the grooved idler roller 50 and the film sensor means 52 through the cutter 54 and placed along the platen 57. The leader 10′ has a double-sided adhesive tape 62 at the leading end which is placed directly against the flat surface of pusher member 64 of a solenoid actuated joining or splicer mechanism 66. This in turn is actuated after a predetermined time delay by either cutter 34 or 54 by means of the respective couplings 67 and 69 and interconnections 71 and 73. An identical type of splicer mechanism 68 including a flat surfaced pusher member 70 is simultaneously energized by cutter 34 or 54 and is located directly across from the splicer member 66. When the end of the film from film cassette A passes over the notched idler roller 30, film sensor member 44 drops into notch 32 actuating the knife member 46 which cuts the tape 10. The actuation of the cutter mechanism 34 causes the splicer mechanisms 66 and 68 to energize after said predetermined time delay, whereupon the flat surface of pusher members 64 and 70 come together causing the end of the tape 10 to press against the adhesive tape 62, causing the film 10 now to be delivered from film cassette B.

This is further illustrated in FIGURE 2 which discloses the pusher members 64 and 70 in an extended or energized position whereupon the end of the film 10 is brought into pressure contact with the leader 10' from cassette B between the flat surfaces of the pusher members. The splice is made by the double-sided adhesive tape 62. The continuously moving film 10 then continues uninterrupted being fed now from the film cassette B.

The now empty cassette A is removed and another is put in its place with the leader 10' now being laid against platen 33 and the flat surface of pusher member 70. When the end of the film from cassette B passes through the idler roller 50, the film sensor 52 will drop into the notch 51. The movement of the film sensor 52 actuates the film cutter 54 so that the knife blade 72 descends downwardly onto the block 74, severing the film. Again, after a predetermined time delay, allowing for the movement of the film 10, the solenoid actuated splicer units 66 and 68 are actauted and a film leader from cassette A is fed onto the film 10 in a manner previously described. Additionally, the drive rollers 40 and 42 are equipped with splice sensing idler rollers 76 and 78. Depending upon in which direction the moving film 10 is going, the movement of either of the sensors 76 or 78 coming into contact with the respective rollers 40 and 42 will indicate the passage of a film splice due to the added thickness passing therebetween.

It should also be pointed out that the pusher members 64 and 70 include rollers 80 and 82 mounted therein and extending aproximately 1/64 of an inch past the flat film contact surface for decreasing the film drag at the time of splicing impact.

Referring now briefly to FIGURE 3, the drawing illustrates the film splice between the film 10 and the leader 10' with the double-sided adhesive tape 62 located between the ends thereof for a predetermined short length. The splice is shown passing between the drive rollers 40 and 42. The splice passes between the drive roller 42 and the splice sensor 78 and the thickness of the splice will force the member 78 outwardly, thus giving an indication that a splice has passed that location.

What has been shown and described with respect to FIGURES 1 and 3 is a continuously moving film supply station wherein film is alternately fed from cassettes A and B to generate a continuous moving film 10 by means of a leader 10' containing a double-sided adhesive 62 applied to its leading end with a pressure splice being formed at the severance location of the previously fed film.

Referring now to FIGURES 4, 5 and 6 and the second embodiment of the invention, there is disclosed means for providing a take-up station whereupon a continuously moving strip of film 10 is fed alternately onto film cassettes A and B which are replaced by empty cassettes when a predetermined length of film has been fed thereto. Referring now to FIGURE 4, an opaque housing 84 is disclosed which includes two compartments 86 and 88, respectively, containing opaque film cassettes A and B, driven by respective motor means 89 and 91. The continuously moving film 10 containing a splice 90 or thickened region at predetermined intervals passes through a pair of mutually oppositely located drive rollers 92 and 94 between a tape guide 96 and between a splice or thickness sensor comprising an idler roller 98 and a movable armature member 100. When the splice passes between the members 98 and 100, the armature 100 is moved outwardly indicating that a splice is passing therebetween. This movement actuates a film cutter 102 and one of the drive motors 89 or 91. The film cutter comprises a guillotine-type of cutter having a knife 104 adapted to move downwardly into contact with the block member 106. The film 10 also passes through the idler rollers 108 and 110 feeding tape onto film cassettes A or B. When the film 10 is severed, the end of the film, for example, passes between the notched idler roller 112 and the film sensor 114 which engages the notch 116. The film sensor 114 is coupled to the drive motor 89 by means of suitable coupling means 115 to deenergize the drive motor 89 to stop the winding of film into the cassette A when the armature of the film sensor falls into the notch 116.

During the period that the film 10 is being fed to film cassette A, a leader 11 of film coupled into film cassette B is threaded between the notched idler roller 118 including a notch 119 and its film sensor 120 across a platen 122 and against the flat surface of pusher member 124 of a solenoid actuated splicer member 126. An identical solenoid actuated splicer member 128 is located opposite therefrom on the other side of the tape and includes a flat surfaced pusher member 130.

As noted above, the cutter 102 is energized when the splice 90 is sensed. At the same time, the drive motor 91, for the film cassette B, is energized by coupling means 125 as well as energizing the splicer members 126 and 128 by interconnections 129 and 131 after a predetermined time delay. The flat surfaces of pusher members 124 and 130 then come together forcing the film 10 against the double-sided adhesive tape 132 on the end of the leader 11. This is shown in more detail in FIGURE 5 where the pusher members 124 and 130 are shown coming together forcing the adhesive tape 132 on the leader 11 into contact with the end of the moving film 10. The splice 90 which triggered the actuation of the cutter 102 continues toward the notched roller 112 where it is to be wound onto film cassette A. When cassette B receives a predetermined length of film, another splice 90 will be sensed by member 100 whereupon cutter 102 is activated, drive motor 89 will be started by means of coupling means 127 and after operation of the splicer film will again be fed to a cassette A which has been replaced with an empty cartridge. Cassette B will be de-energized by sensor 120 through coupling means 117 when the end of the film is sensed.

FIGURE 6 illustrates a time when a splice 90 at the end of the film has passed over the notched roller 112 containing the notch 116 and the film sensor 114 engages the notch 116 whereupon the drive motor 89 for film cassette A is de-energized.

What has been shown and described with respect to the second embodiment is a film splicer for a continuously moving film which is adapted to continuously feed film onto a pair of film cassettes A and B, alternately, so that during the period one cassette is being filled an empty cassette is inserted in the opposite compartment. An adhesive tipped leader in the empty cassettes is applied to the splicer mechanism so that upon the sensing of a thickened area in the continuously moving film strip, the cassette which is currently being fed will be de-activated and a splice will be made with the leader of the other cassette to then feed film in to the empty cassette. Thus, by continuously changing cassettes alternately, a film splicer is provided which allows continuous operation.

While the present invention has been disclosed with a certain degree of particularity, the specification is not meant to be considered in a limited sense since all equivalents, modifications and alternations within the spirit and scope of the present invention are herein meant to be included.

What is claimed is:

1. Apparatus for splicing moving film comprising in combination:

an opaque housing including a first and a second compartment each having an access door and a light-guard door, said light-guard door having means for being actuated by said access door, being closed thereby when said access door is open but being opened to allow film passage therethrough when said access door is closed;

first and second film reel means respectively located in said first and second compartment, being alternately operative for selectively transporting film by either feeding or receiving said film through said light-guard door in a continuously moving strip and wherein at least one of said first and second film reel means includes leader means having adhesive means applied to the leading end thereof; and film cutting and joining apparatus located in said opaque housing between said first and second compartment for effecting a film joint or splice between said leader means and moving film being transported to or from the other film reel means of said first and second film reel, said film cutting and joining apparatus including cutting means for severing said moving film and pusher means for effecting a lap joint, said leading end of said leader means being placed thereagainst, and actuated in timed relationship with said cutting means whereby the leading end of said leader means and a selected cut end of the moving film are forced into pressure contact so that said lap joint is produced by said adhesive means.

2. The apparatus as defined in claim 1 wherein said first and second film reel means comprises opaque film cassettes.

3. The apparatus as defined by claim 1 wherein said pusher means comprises a first and a second solenoid actuated plunger having a substantially flat surface at one end thereof, said leading end of said leader means being placed against one of said flat surfaces, said flat surfaces being moved toward each other upon actuation for effecting said lap joint between said leader means and said one selected cut end of said moving film.

4. The apparatus as defined by claim 1 and additionally including film sensor means adapted to be responsive to a predetermined film condition for film passing into contact therewith including means for being coupled to said cutting means for actuating said cutting means when said predetermined condition is sensed.

5. The apparatus as defined by claim 4 wherein said film sensor means comprises a first and a second film sensor mechanism located in said first and said second compartment and adapted to be reponsive to the absence of film to actuate said cutting means.

6. The apparatus as defined by claim 5 wherein said cutting means comprises a first and a second guillotine-type film cutter proximately located to said first and second film sensor respectively.

7. The invention as defined by claim 1 and additionally including first and second film reel driver means coupled to said first and second film reel and additionally including tape sensor means in said first and second compartment, being selectively in contact with said leader means or said moving film, and coupling means electrically coupling said tape sensor means, respectively, to said first and second driver means for de-activating the respective driver means in absence of film being sensed thereby.

8. The invention as defined by claim 5 wherein said first and second film sensor mechanisms each comprises an idler roller including at least one notch on the outer surface thereof, and an armature member biased toward said idler roller and adapted to abut said idler roller in the absence of film passing therebetween whereupon actuation of said cutting means occurs when said armature means engages said notch.

9. The invention as defined by claim 1 wherein said adhesive means applied to the leading end of said leader means comprises a tape having adhesive applied to both sides thereof.

10. The invention as defined by claim 1 and additionally including a pair of drive rollers located adjacent said cutting and joining apparatus, being adapted to pass said moving film therebetween for effecting film transfer to or from said first and second film reel.

References Cited

UNITED STATES PATENTS

| | | | |
|---|---|---|---|
| 1,540,831 | 6/1925 | De Moos | 242—58.1 |
| 2,752,985 | 7/1956 | Aldrich | 242—58.4 X |
| 3,398,911 | 8/1968 | Poupin | 242—58.4 |

NATHAN L. MINTZ, Primary Examiner